United States Patent
Faion et al.

(10) Patent No.: US 11,455,791 B2
(45) Date of Patent: Sep. 27, 2022

(54) METHOD, DEVICE, COMPUTER PROGRAM, AND MACHINE-READABLE STORAGE MEDIUM FOR THE DETECTION OF AN OBJECT

(71) Applicant: Robert Bosch GmbH, Stuttgart (DE)

(72) Inventors: Florian Faion, Karlsruhe (DE); Alexandru Paul Condurache, Renningen (DE); Claudius Glaeser, Ditzingen (DE); Florian Drews, Renningen (DE); Jasmin Ebert, Heidelberg (DE); Lars Rosenbaum, Lahntal (DE); Rainer Stal, Sindelfingen (DE); Sebastian Muenzner, Leonberg (DE); Thomas Gumpp, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 16/925,454

(22) Filed: Jul. 10, 2020

(65) Prior Publication Data

US 2021/0027082 A1 Jan. 28, 2021

(30) Foreign Application Priority Data

Jul. 22, 2019 (DE) .................... 10 2019 210 801.6

(51) Int. Cl.
*G06V 20/56* (2022.01)
*G06V 10/98* (2022.01)
(Continued)

(52) U.S. Cl.
CPC .......... *G06V 10/98* (2022.01); *G06K 9/6261* (2013.01); *G06K 9/6262* (2013.01);
(Continued)

(58) Field of Classification Search
CPC ...... G06V 20/56; G06V 10/22; G06K 9/6288; G06N 3/04; G06N 3/08
See application file for complete search history.

(56) References Cited

U.S. PATENT DOCUMENTS

| 10,430,691 B1* | 10/2019 | Kim ....................... G06N 3/084 |
| 2019/0251445 A1* | 8/2019 | Movshovitz-Attias ..................... G06N 3/084 |

(Continued)

OTHER PUBLICATIONS

Alexander Neubeck and Luc Van Gool, Efficient non-maximum suppression, 18th International Conference on Pattern Recognition (ICPR'06), 3:850-855 (2006).

(Continued)

*Primary Examiner* — Sam Bhattacharya
(74) *Attorney, Agent, or Firm* — Norton Rose Fulbright US LLP; Gerard Messina

(57) ABSTRACT

A method for the detection of an object in an environment of a vehicle as a function of sensor signals of a sensor for acquiring the environment of the vehicle. The method includes: processing the sensor signals using a region proposal network to obtain at least one object hypothesis per anchor, the object hypothesis including an object probability and a bounding box; selecting the best object hypothesis on the basis of a quality model, the quality model being a function of the anchor and the bounding box of the object hypothesis; identifying redundant object hypotheses relative to the selected object hypothesis, the redundant object hypotheses being identified as a function of the anchors of the redundant object hypotheses, using a target function assigned to the region proposal network; and fusing the selected object hypothesis with the identified redundant object hypotheses for the object detection.

10 Claims, 3 Drawing Sheets

(51) Int. Cl.
*G06K 9/62* (2022.01)
*G06N 3/04* (2006.01)

(52) U.S. Cl.
CPC .......... *G06K 9/6288* (2013.01); *G06V 20/56* (2022.01); *G06N 3/04* (2013.01)

(56) References Cited

U.S. PATENT DOCUMENTS

| | | | |
|---|---|---|---|
| 2019/0303686 A1* | 10/2019 | Guo | G06K 9/6201 |
| 2019/0381965 A1* | 12/2019 | McCool | B60R 21/0134 |
| 2020/0097818 A1* | 3/2020 | Li | G06N 3/084 |
| 2020/0146646 A1* | 5/2020 | Tuzoff | A61B 6/563 |
| 2020/0311466 A1* | 10/2020 | Mohanty | G06K 9/6271 |
| 2020/0377121 A1* | 12/2020 | Gussner | B60W 60/0025 |
| 2020/0394458 A1* | 12/2020 | Yu | G06V 10/25 |

OTHER PUBLICATIONS

Gregory P. Meyer, Ankit Laddha, Eric Kee, Carlos Vallespi-Gonzalez, and Cari K. Wellington, Lasernet: An efficient probabilistic 3d object detector for autonomous driving (2019).

\* cited by examiner

METHOD, DEVICE, COMPUTER PROGRAM, AND MACHINE-READABLE STORAGE MEDIUM FOR THE DETECTION OF AN OBJECT

CROSS REFERENCE

The present application claims the benefit under 35 U.S.C. § 119 of German Patent Application No. DE 102019210801.6 filed on Jul. 22, 2019, which is expressly incorporated herein by reference in its entirety.

FIELD

The present invention relates to a method for detecting an object, and to a correspondingly configured device, a correspondingly configured computer program, and a machine-readable storage medium.

BACKGROUND INFORMATION

Convolutional Neural Networks (CNN) are a type of artificial neural network. Typically, a CNN is constructed in layers of one or more successive so-called convolutional layers, followed by a pooling layer. The sequence of convolutional layers and pooling layer may repeat.

The input to a CNN is made up of matrices that represent data. A typical area of use of CNN is, inter alia, the processing of image or video data.

Discrete convolutions are typically carried out on the convolutional layers using a filter kernel. Typically, the dimension of the input does not change during the application of the discrete convolutions.

On the pooling layers, pooling operations are applied to the input matrices. Typically, here the dimension of the matrices is reduced.

A Region Proposal Network (RPN) is a type of CNN that, for defined positions (anchors) of a supplied representation of a region, estimates whether objects are situated in this region. For this purpose, for each anchor the RPN calculates a so-called objectness score and a so-called bounding box. The objectness score represents the probability (confidence) of the presence of an object in relation to the anchor. The bounding box represents the spatial extension of the object.

Due to the high spatial resolution of the anchor, an RPN usually estimates a large number of redundant object hypotheses for an object situated in the processed region. It is then the task of the post-processing, based on the set of redundant object hypotheses, to determine a set of object detections that contains, as far as possible, only one estimate for each actual object.

Alexander Neubeck and Luc Van Gool, *Efficient non-maximum suppression,* 18th International Conference on Pattern Recognition (ICPR '06), 3:850-855 (2006), describes this post-processing, using a so-called non-maximum suppression (NMS), to select, from all redundant object hypotheses, those having the highest objectness score, and to discard the rest.

In Gregory P. Meyer, Ankit Laddha, Eric Kee, Carlos Vallespi-Gonzalez, and Carl K. Wellington, *Lasernet: An efficient probabilistic 3d object detector for autonomous driving* (2019), as an alternative to NMS, a method is proposed in which overlapping object hypotheses are iteratively combined (clustered) and subsequently fused.

A serious flaw in the classical post-processing according to the existing art is the loss of information that occurs due to the discarding of redundant object hypotheses.

In addition, in the methods for post-processing from the existing art, the identification of redundant object hypotheses is carried out phenomenologically, without taking into account the known output structure of the RPN as modeling knowledge.

The quality of the object hypotheses is also ascertained purely phenomenologically, using a trained hyperparameter.

SUMMARY

The present invention provides a method for detecting an object in an environment of a vehicle as a function of sensor signals. The sensor signals originate from a sensor for acquiring the environment of the vehicle. The sensor signals represent the environment of the vehicle.

In accordance with an example embodiment of the present invention, the method includes the following steps:
processing the sensor signals, using a region proposal network, in order to obtain at least one object hypothesis per anchor, the object hypothesis including an object probability and a bounding box;
selecting the best object hypothesis on the basis of a quality model, the quality model being a function of the anchor, and the bounding box being the object hypothesis;
identifying redundant object hypotheses relative to the selected object hypothesis, the redundant object hypotheses being identified as a function of the anchors of the redundant object hypotheses, using a target function assigned to the region proposal network,
fusing the selected object hypothesis with the identified redundant object hypotheses for the object detection.

The task of object detection can be improved by the example method of the present invention. This is achieved by taking into account a target function assigned to the region proposal network, and available modeling knowledge.

In the present context, a sensor for acquiring an environment of a vehicle can be understood as an environmental sensor. Environmental sensors are based on the acquisition of different physical effects. The best-known environmental sensors include video sensors, radar sensors, laser sensors, and sound sensors, in particular ultrasound sensors. Combinations of these sensors are also possible. In addition, further sensor technologies are also possible that are suitable for producing signals that represent an environment of a vehicle.

In the present context, an object probability can be understood as the objectness score outputted by an RPN, i.e., the probability that a (sought) object is situated in the processed representation of the environment, at the respective anchor.

In the present context, a bounding box can be understood as an enclosing boundary placed around the presumed (sought) object at the respective anchor.

In the present context, a target function, or RPN target function, assigned to the region proposal network can be understood as a function that is assigned to the RPN being used, or that is a function dependent on this RPN, that, starting from a specified bounding box and a specified position of the processed region, indicates whether the position is situated in the vicinity of the bounding box. In the present case, "vicinity" can be understood as a specified distance around the bounding box.

In accordance with the present invention, the position of an anchor of an object hypothesis relative to the bounding box of the object hypothesis is a measure of the quality of the object hypothesis; in other words, the present invention is based on an anchor-dependent quality model.

A suitable realization of the anchor-dependent quality model is a covariance matrix of the parameters of the bounding box for the object hypothesis.

To calculate it, for example the object hypotheses of the RPN for a validation data set can be evaluated. Because, for each hypothesis, its relative anchor position is known, the corresponding quality to be expected (in the form of an average value and a covariance matrix) can be statistically ascertained therefrom.

In addition, in accordance with the present invention, for a given object hypothesis, on the basis of the RPN target function, it is known which further anchors also support this object hypothesis.

After the step of fusing, the set of the object hypothesis may have been reduced.

Despite the reduction of the object hypotheses, it can be possible that the remaining object hypotheses have intersecting bounding boxes. This may be evidence that one and the same object is supported in the region of two separate object hypotheses. Using a suitable method, as described in, for example, Alexander Neubeck and Luc Van Gool, *Efficient non-maximum suppression,* 18th International Conference on Pattern Recognition (ICPR '06), 3:850-855 (2006), or Gregory P. Meyer, Ankit Laddha, Eric Kee, Carlos Vallespi-Gonzalez, and Carl K. Wellington, *Lasernet: An efficient probabilistic 3d object detector for autonomous driving* (2019), this remaining redundancy can be resolved.

According to a specific embodiment of the method of the present invention, in the step of identification, using the RPN target function, those object hypotheses are identified as redundant that, as a function of their anchor, are situated within a specified distance from the selected object hypothesis, or from the bounding box of the selected object hypothesis.

Due to the fact that, according to this specific embodiment, object hypotheses are identified as redundant if, as a function of their anchor, they are situated within a specified distance from the selected object hypothesis, redundant object hypotheses are identified on the basis of a criterion for vicinity. In other words, the selection of an object hypothesis identified as redundant is made independent of its objectness score. As a result, according to this specific embodiment it is possible to recognized so-called false positive object detections, and correspondingly to prevent them or to reduce their number.

A false positive object detection may occur if, due to artefacts in the input data or due to deficiencies of the RPN that is used, a high objectness score is ascertained for an anchor even though no object is actually situated in the associated region of the environment.

Typically, false positive object detections are single errors. Correspondingly, the object hypothesis at this anchor is not supported by object hypotheses that, as a function of the target function of the RPN, are situated in the vicinity and thus represent a redundant object hypothesis.

In the step of fusing, the selected object hypothesis is then identified as errored, and correspondingly does not result in an object detection.

This may happen for example if, in the step of fusing, the respective object probabilities (objectness scores) of the object hypotheses to be fused are fused. As a result, the individual incorrect high object probability may be reduced by the correct low object probability of the object hypothesis situated in the vicinity, in such a way that, ultimately, the fused object hypothesis does not support the detection of an object.

According to a specific embodiment of the method of the present invention, in the step of fusing the selected object hypothesis and the identified object hypotheses are fused as a function of their respective quality model.

For the fusing of the object hypotheses, there are appropriate fusion mechanisms. These include, inter alia, the method of weighted least squares. The median, mean shift, or RANSAC methods are also possible.

Independent of the selected fusing mechanism, this specific embodiment has the advantage that for the fusion, the quality model of the respective object hypothesis is used.

According to a specific embodiment of the method of the present invention, the quality model of the object hypothesis is a function of the position of the anchor of the object hypothesis relative to the bounding box of the object hypothesis.

In accordance with this specific embodiment of the present invention, the quality of the object hypothesis is decisively determined by the position of the anchor relative to the associated bounding box. In contrast to a phenomenological approach to the determination of the quality of an object hypothesis, which can be produced for example using a method of unmonitored learning, the proposed quality model originates from an explicit modeling. This approach incorporates existing modeling knowledge into the object detection, and thus results in improved detection results.

An empirical approach has shown that an object hypothesis is of particularly high quality the closer the associated anchor of the hypothesis is to the center of the bounding box.

According to a specific embodiment of the method of the present invention, the quality model is in addition a function of the region proposal network.

In accordance with this specific embodiment of the present invention, the quality of an object hypothesis is closely linked with the region proposal network that produced the object hypothesis. By taking into account the RPN in the production of the quality model in addition to the position of the anchor relative to the associated bounding box, an improved quality model can be created. A quality model for an object hypothesis is best when the associated bounding box encloses the detected object as closely as possible.

According to a specific embodiment of the present invention, the quality model is in addition a function of further influences on the quality of the object hypothesis.

One of these influences may be a geometry between the sensor and the object to be detected. Such a geometry can be for example the distance between the sensor and the object to be detected.

Such a modeling is useful if it is known, for example, that object hypotheses at a great distance can be expected to have poorer quality.

According to a specific embodiment of the method of the present invention, in the step of fusing, the fusion of the selected object hypothesis and of the identified object hypothesis is then used as the new selected object hypothesis, and subsequently the method continues with the step of identification using the new selected object hypothesis.

According to this specific embodiment of the present invention, the fusion of the object hypothesis first selected as the best hypothesis with the identified object hypotheses is done iteratively.

According to an alternative specific embodiment of the method of the present invention, the step of selecting is delayed. This specific embodiment begins with the step of identification. In this specific embodiment, in the step of identification the redundant object hypotheses are not identified as a function of a selected (best) object hypothesis, but rather in relation to the total set of object hypotheses. The step of selection then takes place after the step of fusing, based on the fused object hypotheses, which then no longer have any redundancies.

A further aspect of the present invention is a device that is designed to execute all steps of the method according to the present invention.

A further aspect of the present invention is a computer program that is designed to execute all steps of the method according to the present invention.

A further aspect of the present invention is a machine-readable storage medium on which the computer program according to the present invention is stored.

BRIEF DESCRIPTION OF THE DRAWINGS

Preferred specific embodiments of the present invention are explained below on the basis of the figures.

DETAILED DESCRIPTION OF EXAMPLE EMBODIMENTS

Figure 1:
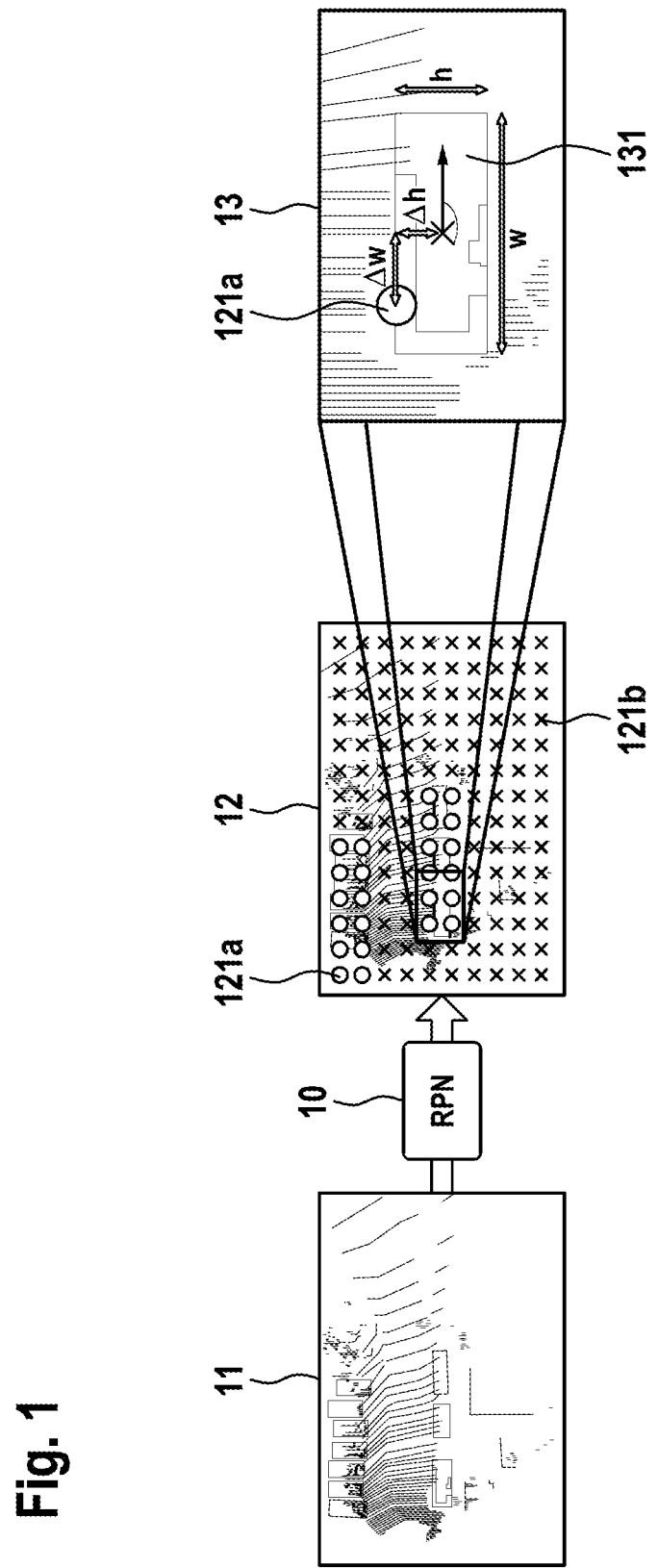
FIG. 1 shows a schematic representation of a region proposal network according to an example embodiment of the present invention.

FIG. 1 schematically shows the functioning of a region proposal network (RPN) 10.

Input data 11 are processed in RPN 10, and result in network outputs 12 having a fixed structure. Network output 12 includes anchors 121a, 121b, shown as points 121a or crosses 121b.

Anchors 121a shown as points represent anchor positions at which a (dynamic) object is estimated, as a function of the target function of the RPN. Anchors 121b shown as crosses represent anchor positions at which no (dynamic) object is estimated as a function of the target function of the RPN.

For an anchor 121a, 121b, an object hypothesis 13 is ascertained. This hypothesis includes a probability for the object estimation, the so-called objectness score, as well as a so-called bounding box 131.

Bounding box 131 has a width w and a height h, as well as an offset, in the vertical direction Δw and horizontal direction Δh, relative to the position of anchor 121a.

Figure 2:
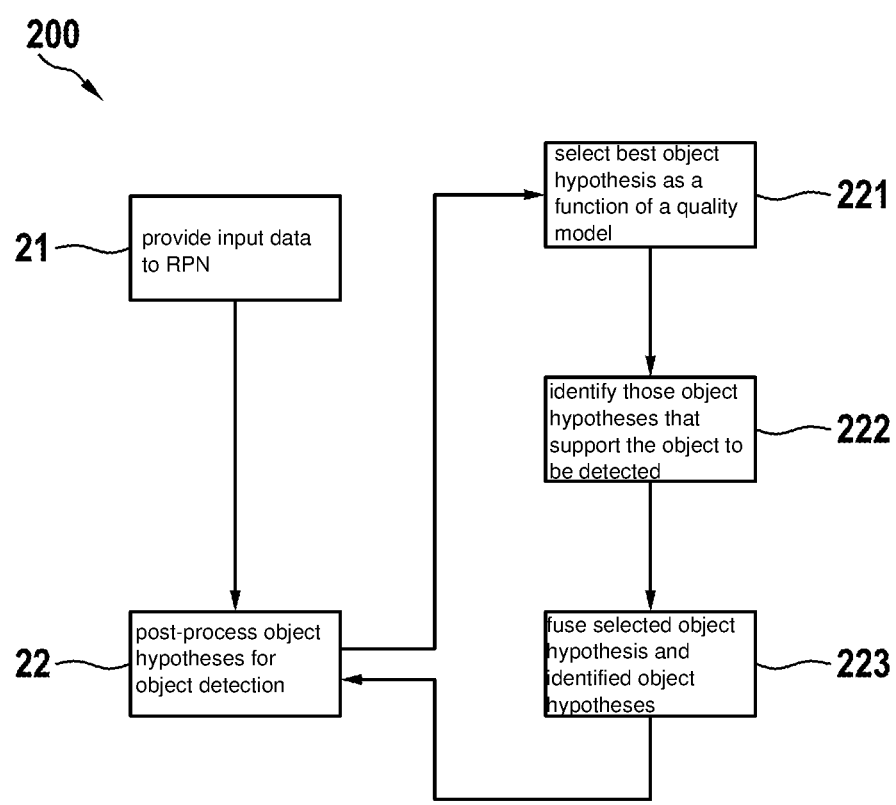
FIG. 2 shows a flow diagram of a specific embodiment of the method according to the present invention.

FIG. 2 shows a flow diagram of a specific embodiment of method 200 according to the present invention.

In step 21, input data 11, typically sensor data that represent a region, are provided to a region proposal network (RPN) 10. After processing by RPN 10, there are one or more object hypotheses 13.

In step 22, the object hypotheses 13 are post-processed for the object detection.

In step 221, the best object hypothesis 13 is selected as a function of a quality model. As quality model, here the position of anchor 121a, 121b of object hypothesis 13 relative to bounding box 131 of object hypothesis 13 may be used. For this purpose, it is appropriate to use the vertical offset Δw and the horizontal offset Δh.

In step 222, on the basis of the selected object hypothesis 13, as a function of the RPN target function those object hypotheses 13 are identified that support the object to be detected.

In step 223, the selected object hypothesis 13 and the identified object hypotheses 13 are fused.

The result of the post-processing can include detected objects in the supplied region. If no object is situated in the supplied region, then the result of the method should reflect this, and correspondingly no object should be detected in the supplied region.

Figure 3:
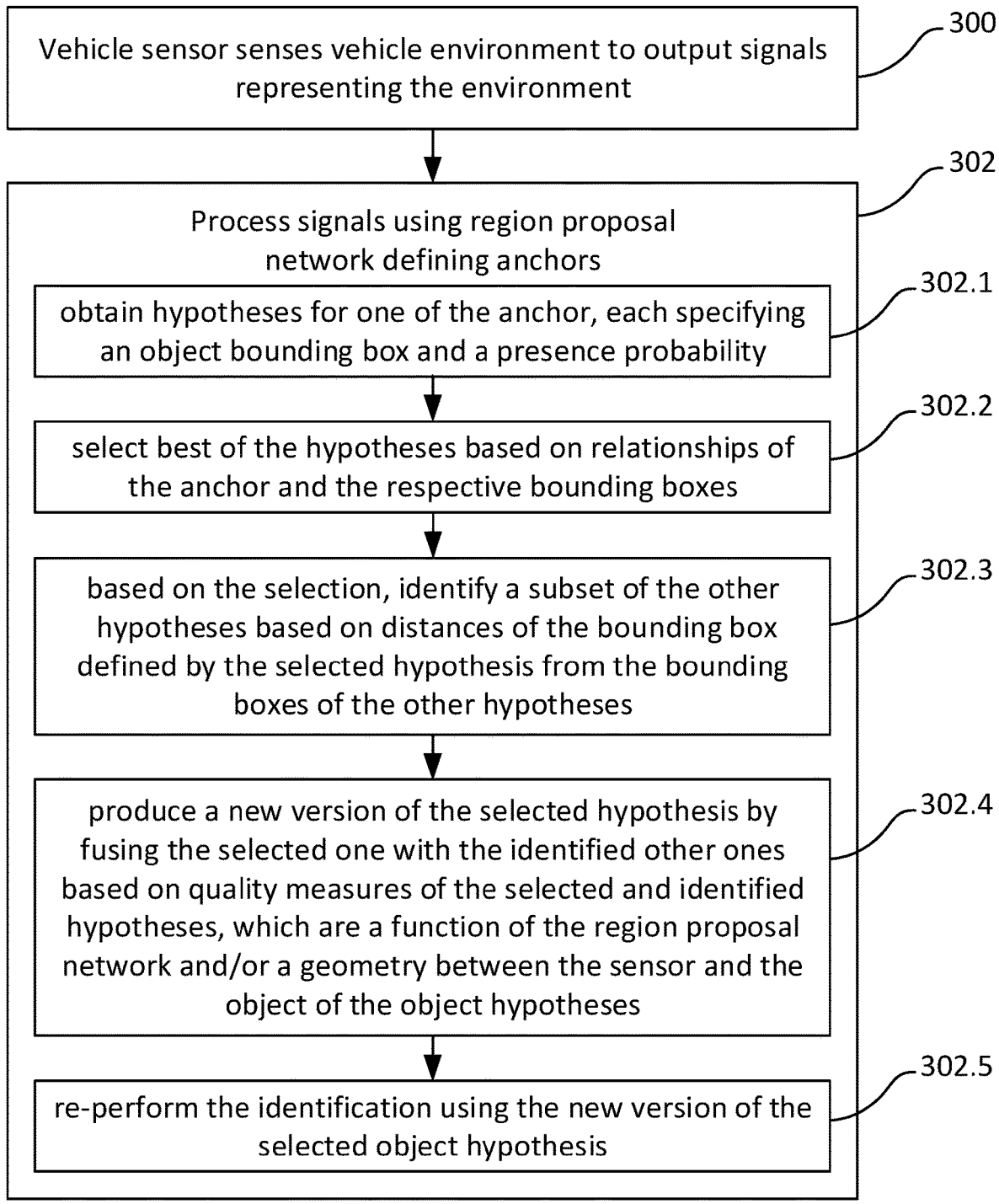
FIG. 3 shows a flow diagram of a method implemented for a vehicle environment according to an example embodiment of the present invention.

FIG. 3 illustrates a method according to an example embodiment of the present invention. At step 300, a vehicle sensor senses and environment of a vehicle to output to a processor corresponding signals representing the sensed environment. At step 302, the processor uses a region proposal network that defines anchors for a region of the sensed environment to process the sensor signals. Step 302 includes the following sub-steps, which can be performed for one of more of the anchors. At step 302.1, the processor obtains for the respective anchor object hypotheses that each specifies an object bounding box and a probability of presence of an object for which the bounding box is specified. At step 302.2, the processor selects a best of the hypotheses based on relationships of the anchor and the respective bounding boxes of the hypotheses. At step 302.3, based on the selection, the processor identifies a subset of the other hypotheses that are relevant to the selected hypothesis based on distances of the bounding box defined by the selected hypothesis from the respective bounding boxes of the other hypotheses. At step 302.4, the processor produces a new version of the selected hypothesis by fusing the selected hypotheses with the other identified hypotheses based on quality measures of the selected and identified hypotheses, where the quality measures are a function of the region proposal network and/or a geometry between the sensor and the object of the object hypotheses. At step 302.5, the processor re-performs the identification using the new version of the selected object hypothesis.

What is claimed is:

1. A method for detection of objects in an environment of a vehicle as a function of sensor signals of a sensor, the sensor signals representing the environment of the vehicle, the method comprising:
    processing the sensor signals using a region proposal network that defines a plurality of anchors for a region of the environment, wherein the processing includes, for each of at least one of the anchors:
        obtaining a plurality of object hypotheses for the respective anchor, each respective one of the plurality of object hypotheses specifying a bounding box of a respective object and a respective probability of presence of the respective object, whose bounding box is specified by the respective object hypothesis, is located at the respective anchor;
        selecting a best one of the plurality of object hypotheses based on relationships of the anchor and the respective bounding boxes of the object hypotheses;
        based on the selection of the best one of the plurality of object hypotheses, using a relationship of the selected best one of the plurality of object hypotheses to each of all others of the plurality of object hypotheses to identify a subset of the others of the plurality of object hypotheses that are relevant to the selected best one of the plurality of object hypotheses; and based on the identification, fusing the selected best one of the plurality of object hypotheses with the identified object hypotheses.

2. The method as recited in claim 1, wherein the identification is determined based on respective distances of the bounding box defined by the selected best one of the plurality of object hypotheses from the respective bounding boxes of the others of the plurality of object hypotheses.

3. The method as recited in claim 1, wherein the fusion is performed based on respective quality measures of the selected best one of the plurality of object hypotheses and of the identified subset of the others of the plurality of object hypotheses, each of the quality measures being a function of a respective relative position of the anchor relative to the respective bounding box of the respective object hypothesis.

4. The method as recited in claim 3, wherein the fusion is performed based on respective quality measures of the selected best one of the plurality of object hypotheses and of the identified subset of the others of the plurality of object hypotheses, and the quality measures are a function of the region proposal network.

5. The method as recited in claim 3, wherein the fusion is performed based on respective quality measures of the selected best one of the plurality of object hypotheses and of the identified subset of the others of the plurality of object hypotheses, and the quality measures are a function of a geometry between the sensor and the object of the object hypotheses.

6. The method as recited in claim 1, wherein the fusion produces a new version of the selected object hypothesis, and the method further comprises re-performing the identification using the new version of the selected object hypothesis.

7. The method as recited in claim 1, wherein the fusion is performed based on respective quality measures of the selected best one of the plurality of object hypotheses and of the identified subset of the others of the plurality of object hypotheses, each of the quality measures being a function of a respective covariance matrix of parameters of the respective bounding box of the respective object hypothesis.

8. The method as recited in claim 1, further comprising determining, based on a result of the fusion, that the selected best one of the plurality of object hypotheses is a false positive indication of the presence of the respective object.

9. A device configured for detection of objects in an environment of a vehicle as a function of sensor signals of a sensor, the sensor signals representing the environment of the vehicle, the device configured to:
process the sensor signals using a region proposal network that defines a plurality of anchors for a region of the environment, wherein the processing of the sensor signals includes, for each of at least one of the anchors:
obtaining a plurality of object hypotheses for the respective anchor, each respective one of the plurality of object hypotheses specifying a bounding box of a respective object and a respective probability of presence of the respective object, whose bounding box is specified by the respective object hypothesis, is located at the respective anchor;
selecting a best one of the plurality of object hypotheses based on relationships of the anchor and the respective bounding boxes of the object hypotheses;
based on the selection of the best one of the plurality of object hypotheses, using a relationship of the selected best one of the plurality of object hypotheses to each of all others of the plurality of object hypotheses to identify a subset of the others of the plurality of object hypotheses that are relevant to the selected best one of the plurality of object hypotheses; and
based on the identification, fusing the selected best one of the plurality of object hypotheses with the identified object hypotheses.

10. A non-transitory machine-readable storage medium on which is stored a computer program for detection of objects in an environment of a vehicle as a function of sensor signals of a sensor, the sensor signals representing the environment of the vehicle, the computer program, when executed by a computer, causing the computer to perform the following steps:
processing the sensor signals using a region proposal network to that defines a plurality of anchors for a region of the environment, wherein the processing includes, for each of at least one of the anchors:
obtaining a plurality of object hypotheses for the respective anchor, each respective one of the plurality of object hypotheses specifying a bounding box of a respective object and a respective probability of presence of the respective object, whose bounding box is specified by the respective object hypothesis, is located at the respective anchor;
selecting a best one of the plurality of object hypotheses based on relationships of the anchor and the respective bounding boxes of the object hypotheses;
based on the selection of the best one of the plurality of object hypotheses, using a relationship of the selected best one of the plurality of object hypotheses to each of all others of the plurality of object hypotheses to identify a subset of the others of the plurality of object hypotheses that are relevant to the selected best one of the plurality of object hypotheses; and
based on the identification, fusing the selected best one of the plurality of object hypotheses with the identified object hypotheses.

* * * * *